United States Patent
Lee (10) Patent No.: US 7,318,848 B2
(45) Date of Patent: Jan. 15, 2008

(54) DUST COLLECTOR FOR A VACUUM CLEANER

(75) Inventor: Hei-Wang Lee, Tainan (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 375 days.

(21) Appl. No.: 11/023,927

(22) Filed: Dec. 28, 2004

(65) Prior Publication Data

US 2006/0137301 A1 Jun. 29, 2006

(51) Int. Cl.
  *A47L 9/16* (2006.01)
(52) U.S. Cl. .............................. 55/283; 55/284; 55/289; 55/301; 55/304; 55/DIG. 3; 95/277; 95/278; 15/347; 15/352
(58) Field of Classification Search ................. 55/289, 55/283, 284, 301, 304, DIG. 3; 95/277, 95/278; 15/347, 352
See application file for complete search history.

(56) References Cited

U.S. PATENT DOCUMENTS

| 399,984 | A | * | 3/1889 | Gessl .......................... 55/290 |
| 6,391,073 | B1 | * | 5/2002 | Koga ........................... 55/289 |
| 6,757,933 | B2 | * | 7/2004 | Oh et al. ....................... 15/353 |
| 6,928,692 | B2 | | 8/2005 | Oh et al. |
| 7,186,281 | B2 | * | 3/2007 | Cheng .......................... 55/289 |
| 2006/0042202 | A1 | * | 3/2006 | Lee et al. ..................... 55/289 |

* cited by examiner

*Primary Examiner*—Duane Smith
*Assistant Examiner*—Minh-Chau T. Pham
(74) *Attorney, Agent, or Firm*—Ladas & Parry LLP (57) ABSTRACT

A dust collector is disposed between an intake port and an exhaust port in a vacuum cleaner. Air flows from the intake port into the exhaust port along an airflow path in the dust collector. The dust collector includes a dust-collecting net disposed in the path, and a dust-brushing unit. When air flows from the intake port into the exhaust port, a plurality of dust brushes of the dust-brushing unit rotate to brush the net so as to remove dust from the net. Therefore, air can flow unimpeded through the net.

21 Claims, 9 Drawing Sheets

DUST COLLECTOR FOR A VACUUM CLEANER

BACKGROUND OF THE INVENTION

1. Field of the Invention

This invention relates to a dust collector, and more particularly to a dust collector that is disposed between an intake port and an exhaust port in a vacuum cleaner.

2. Description of the Related Art

A conventional vacuum cleaner includes a dust collector that is disposed between an intake port and an exhaust port and that is formed with an airflow path. The dust collector is disadvantageous in that a downstream end of the airflow path, which is disposed adjacent to the exhaust port, is apt to be clogged with dust. This adversely affects the suction performance of the vacuum cleaner.

SUMMARY OF THE INVENTION

The object of this invention is to provide a dust collector for a vacuum cleaner, which has an airflow path in fluid communication with an intake port and an exhaust port in the vacuum cleaner, and a dust-brushing unit that can prevent clogging of the airflow path.

A dust collector is disposed between an intake port and an exhaust port in a vacuum cleaner. Air flows from the intake port into the exhaust port along an airflow path in the dust collector. The dust collector includes a dust-collecting net disposed in the path, and a dust-brushing unit. When air flows from the intake port into the exhaust port, a plurality of dust brushes of the dust-brushing unit rotate to brush the net so as to remove dust from the net. Therefore, air can flow unimpeded through the net.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Referring to FIGS. 1, 2, 3, and 4, the first preferred embodiment of a dust collector 10 according to this invention is incorporated in an upright type vacuum cleaner. The vacuum cleaner has a cleaner body 1 that includes a dust-sucking portion 11 and a dust-collecting portion 12. The dust-collecting portion 12 is formed with an intake port 121 and an exhaust port 122. The dust collector 10 is disposed removably within a mounting chamber 123 in the dust-collecting portion 12, and is located between the intake port 121 and the exhaust port 122.

The dust collector 10 includes a dust-collecting main seat 2, a mounting seat 3 connected removably to the dust-collecting main seat 2, a dust-brushing unit 4 disposed on the mounting seat 3, and a pre-separating seat 5 connected removably to the mounting seat 3.

The dust-collecting main seat 2 includes a bottom wall 21 having a first inlet 211, a dust-collecting main wall 22 extending upwardly from an outer periphery of the bottom wall 21, and a first dust-collecting chamber 23 defined by the bottom wall 21 and the dust-collecting main wall 22, and an air-guiding tube 24 positioned within the first dust-collecting chamber 23. The first inlet 211 in the bottom wall 21 is in fluid communication with the intake port 121 in the cleaner body 1 so as to allow for the flow of incoming dust-laden air into the first inlet 211 through the intake port 121. The first dust-collecting chamber 23 has an upper end opening 231. The air-guiding tube 24 defines an air passage 25 therein, and has a lower end connected fixedly to the bottom wall 21 and disposed around the first inlet 211, a vertical lower tube portion 241 defining a vertical passage portion 251, and an inclined guiding portion 242 defining an upper end outlet 252. The upper end outlet 252 is oriented so as to guide the incoming dust-laden air to flow toward a portion of the dust-collecting main wall 22 above the vertical lower tube portion 241 of the air-guiding tube 24.

An annular flexible sealing strip 30 is sleeved fixedly on an upper end of the mounting seat 3, and is press fitted within the upper end opening 231 of the first dust-collecting chamber 23 in the dust-collecting main seat 2. As such, the mounting seat 3 is connected removably to the dust-collecting main seat 2, and is disposed within the upper end opening 231 of the first dust-collecting chamber 23. As a result, an airtight seal is established between the mounting seat 3 and the dust-collecting main seat 2. The mounting seat 3 includes a surrounding wall 31, a horizontal bottom plate 32 disposed fixedly within the surrounding wall 31, a circular intake tube 33 projecting downwardly from the bottom wall 32, a mounting plate 35 disposed above the bottom plate 32 and defining a wheel chamber 36, a retaining hook unit 37, and a wind-guiding chamber 38 disposed between the bottom plate 32 and the mounting plate 35.

The surrounding wall 31 has a pair of left and right wall units 311, 312. The left wall unit 311 has a lower end that is formed with a hook plate 314. The hook plate 314 has a hook hole 313. The right wall unit 312 is formed with a groove 315 for mounting with the retaining hook unit 37. The retaining hook unit 37 includes a cover plate 371 connected threadedly to the right wall unit 312, a coiled compression spring 372 disposed within the groove 315, and a hook member 373. The hook member 373 is generally L-shaped, and has a horizontal rod portion 374 projecting outwardly from a hole in the cover plate 371, and a hook portion 375 extending integrally and downwardly from the horizontal rod portion 374. The bottom plate 32 has a second inlet 321. The intake tube 33 includes a cylindrical surrounding wall 331, a connecting wall 332 having an outer periphery connected fixedly to a lower end of the surrounding wall 331, a plurality of vent holes 333 formed through the surrounding wall 331, and a first rod hole 334 formed through a central portion of the connecting wall 332. The surrounding wall 331 has an upper end secured within the second inlet 321 in the bottom plate 32. The mounting plate 35 is formed with a second rod hole 351 disposed directly above the first rod hole 334 in the connecting wall 332. The wheel chamber 36 is in fluid communication with the exhaust port 122 in the cleaner body 1. The wind-guiding chamber 38 has a wind-guiding outlet 381 that guides air from the intake tube 33 into the wheel chamber 36.

The dust-brushing unit 4 includes a dust-collecting net 40, a vane wheel 41, a rotatable brush holder 42, a plurality of dust brushes 43, and a connecting rod 44. The dust-collecting net 40 covers the vent holes 333 in the intake tube 33, and has a plurality of meshes that are sized so as to prevent passage of dust therethrough. The vane wheel 41 is disposed rotatably within the wheel chamber 36 in the mounting seat 3, is located directly above the intake tube 33, and includes a plurality of curved vanes 411. The rotatable brush holder 42 is disposed under the bottom plate 32 of the mounting seat 3, and includes two diametrically opposed vertical mounting walls 421, a horizontal connecting wall 422 interconnecting lower ends of the mounting walls 421 fixedly, and a connecting ring 423 interconnecting upper ends of the mounting walls 421 fixedly. The mounting walls 421 are spaced apart from each other by a distance slightly larger than the diameter of the intake tube 33. The dust brushes 43 are secured to the mounting walls 421 of the rotatable brush holder 42, and extend toward the intake tube 33. On each of the mounting walls 421, the dust brushes 43 are equidistant. The dust brushes 43 secured to the left mounting wall 421 are staggered with respect to those secured to the right mounting wall 421. The connecting rod 44 extends through the second rod hole 351 in the mounting plate 35, the first rod hole 334 in the connecting wall 332 of the mounting seat 3, and a hole 422' in the connecting wall 422 of the rotatable brush holder 42, and interconnects the vane wheel 41 and the rotatable brush holder 42 fixedly.

The pre-separating seat 5 is disposed within the first dust-collecting chamber 23 in the dust-collecting main seat 2, is connected removably to the mounting seat 3, and receives the intake tube 33 of the mounting seat 3. The pre-separating seat 5 includes a horizontal base wall 51, a surrounding wall 52, a first wind-guiding plate 53, a second wind-guiding plate 54, a vertical slot 55, a projection 56, a dust-removing chamber 57, and two second dust-collecting chambers 58.

The base wall 51 is formed with a plurality of vertical vent holes 511 that are disposed under the dust-removing chamber 57 and that are sized so as to allow passage of fine dust particles therethrough. Therefore, when the incoming dust-laden air enters into the first dust-collecting chamber 23 in the dust-collecting main seat 2 via the first inlet 211, the pre-separating seat 5 can prevent coarse dust particles, which are more bulky than the fine dust particles capable of passing through the vent holes 511 in the base wall 51, from entering the dust-removing chamber 57. Hence, coarse dust particles are prevented from approaching the intake tube 33 of the mounting seat 3. The end result is that the coarse dust particles are collected within the first dust-collecting chamber 23.

The surrounding wall 52 extends upwardly from an outer periphery of the base wall 51, and has a left wall 521, a right wall 522, a front wall 523, a rear wall 524, a retaining projection 525 extending outwardly from an upper end of the left wall 521, and a horizontal retaining bar 526. The first wind-guiding plate 53 is disposed adjacent to the left wall 521, and has a lower side formed integrally with the base wall 51, a vertical front side formed integrally with the front wall 523, and an upper side abutting against a bottom surface of the bottom plate 32 of the mounting seat 3. As such, a first wind-guiding port 531 is defined between the rear wall 524 and a vertical rear side of the first wind-guiding plate 53. The second wind-guiding plate 54 is disposed adjacent to the right wall 522, and has a lower side formed integrally with the base wall 51, a vertical rear side formed integrally with the rear wall 524, and an upper side abutting against the bottom surface of the bottom wall 32 of the mounting seat 3. As such, a second wind-guiding port 541 is defined between the front wall 523 and a vertical front side of the second wind-guiding plate 54. The projection 56 extends inwardly from the right wall 522. The slot 55 is formed in the right wall 522, and extends into the projection 56. The retaining bar 526 is disposed at an upper end of the slot 55. The dust-removing chamber 57 is defined between the front wall 523 and the rear wall 524, and between the first and second wind-guiding plates 53, 54. One of the second dust-collecting chambers 58 is defined between the front wall 523 and the rear wall 524, and between the left wall 521 and the first wind-guiding plate 53, and is in fluid communication with the dust-removing chamber 57 via the first wind-guiding port 531. The other of the second dust-collecting chambers 58 is defined between the front wall 523 and the rear wall 524, and between the right wall 522 and the second wind-guiding plate 54, and is in fluid communication with the dust-removing chamber 57 via the second wind-guiding port 541. The retaining projection 525 engages the hook hole 313 in the hook plate 314 of the mounting seat 3. The hook portion 375 of the hook member 373 of the mounting seat 3 extends into the slot 55 in the pre-separating seat 5, and is biased by the spring 372 to move to the right so as to abut against a bottom surface of the retaining bar 526 of the pre-separating seat 5. As such, the pre-separating seat 5 is attached removably to the mounting seat 3. The horizontal rod portion 374 of the hook member 373 is biased by the spring 372 to project from the cover plate 371. The portion of the horizontal rod portion 374 projecting from the cover plate 371 can be pressed against the biasing action of the spring 372 so as to separate the hook member 373 from the retaining bar 526. This allows for removal of the pre-separating seat 5 from the mounting seat 3.

An airflow path is formed in the dust collector 10 between the intake port 121 and the exhaust port 122 of the cleaner body 1, and includes the first inlet 211, the air passage 25, the first dust-collecting chamber 23, the vent holes 511, the dust-removing chamber 57, the vent holes 333, an interior space within the intake tube 33, the wind-guiding chamber 38, the wind-guiding outlet 381, and the wheel chamber 36.

When a motor (not shown) is powered so as to force dust-laden air into the intake port 121 in the cleaner body 1, air will flow along the airflow path.

Figure 1:
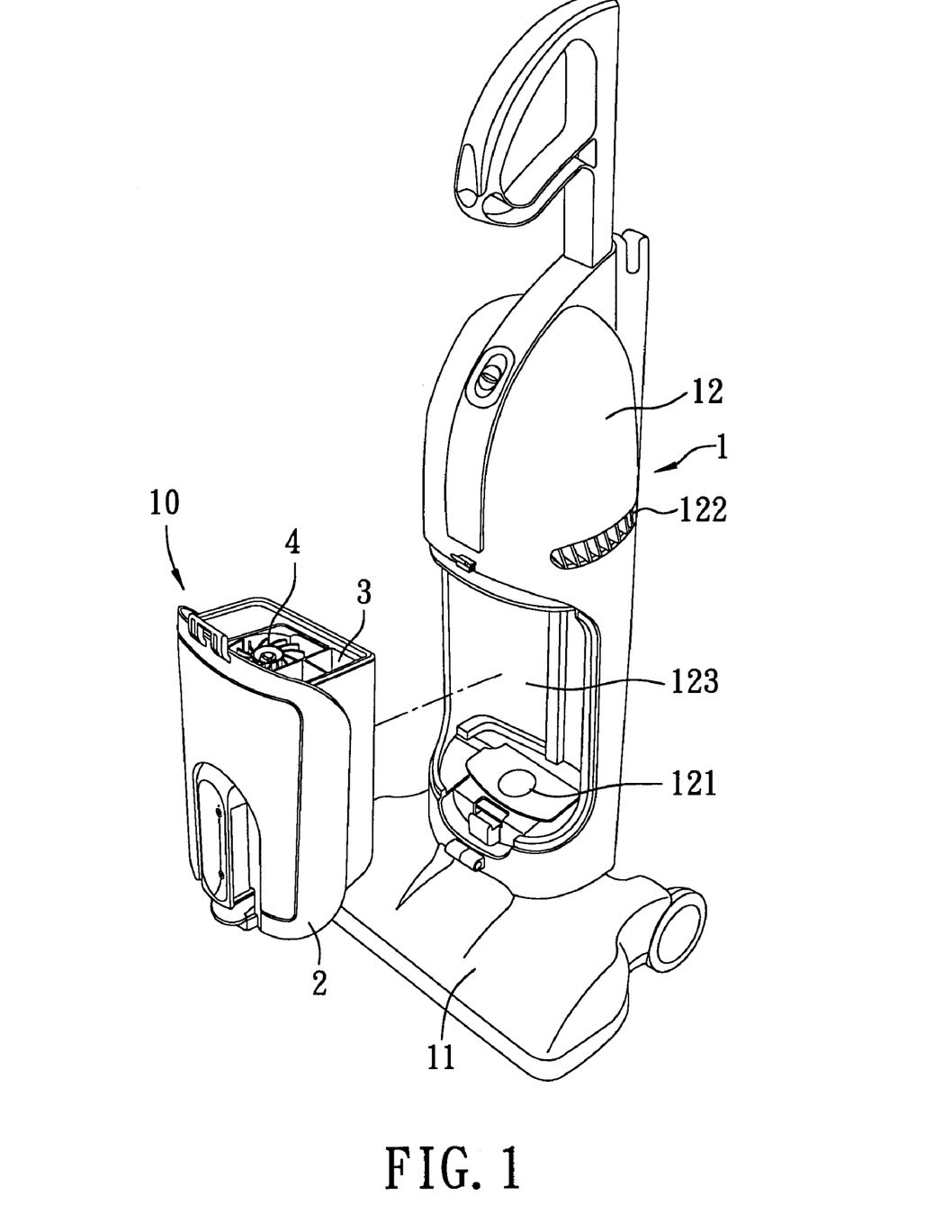
FIG. 1 is a partly exploded perspective view of an upright type vacuum cleaner that incorporates the first preferred embodiment of a dust collector according to this invention.
Figure 2:
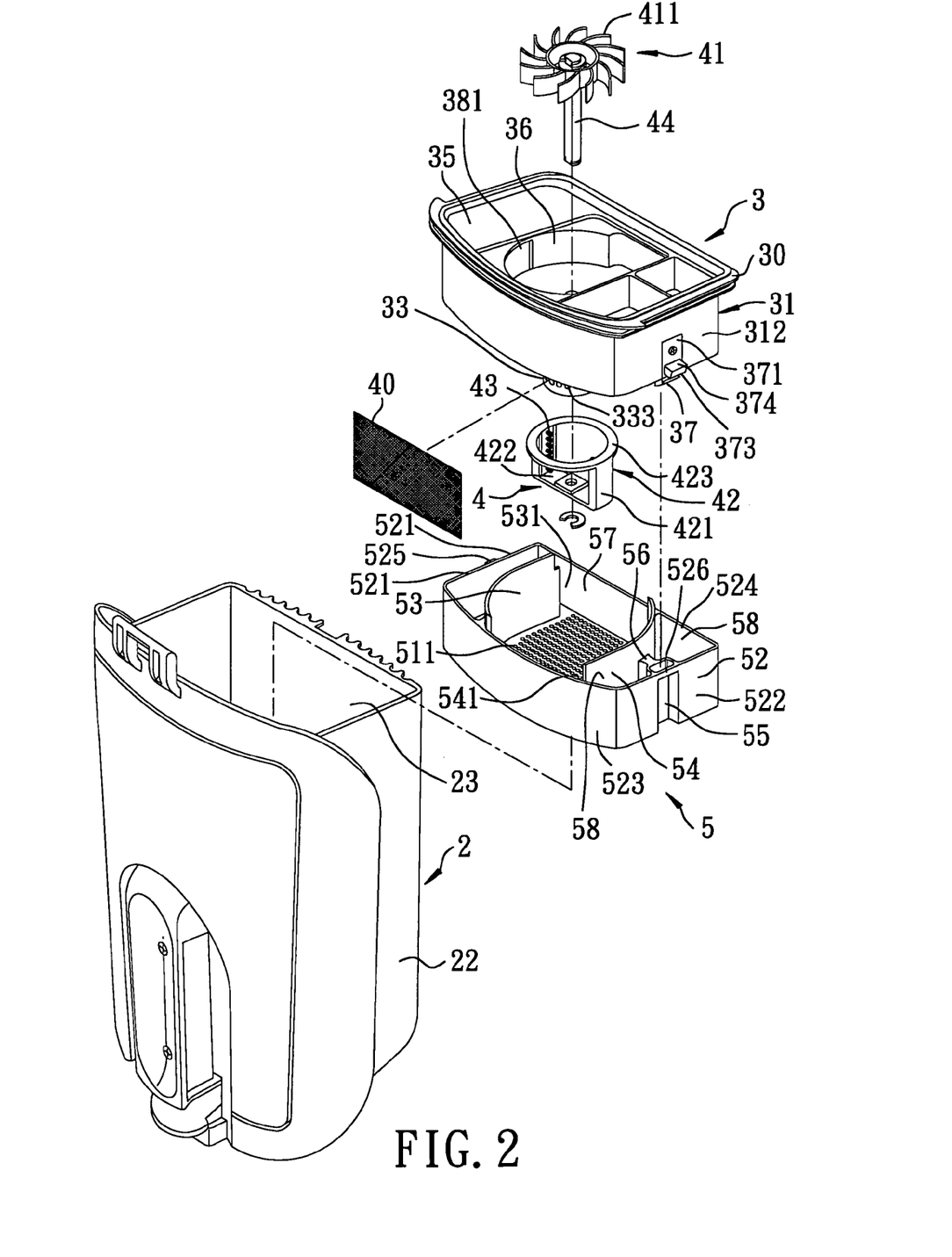
FIG. 2 is a partly exploded perspective view of the first preferred embodiment.
Figure 3:
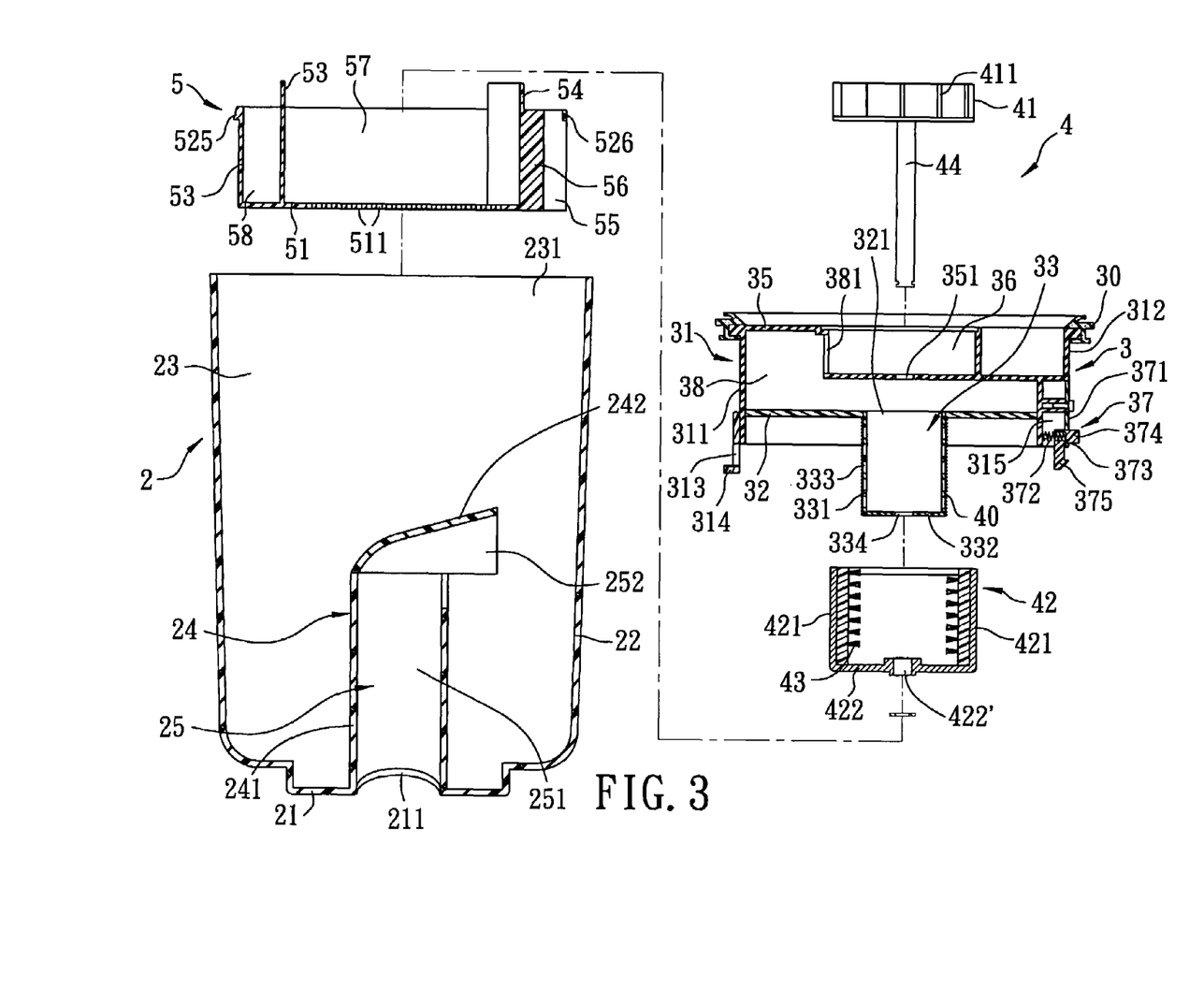
FIG. 3 is a partly exploded sectional view of the first preferred embodiment.
Figure 4:
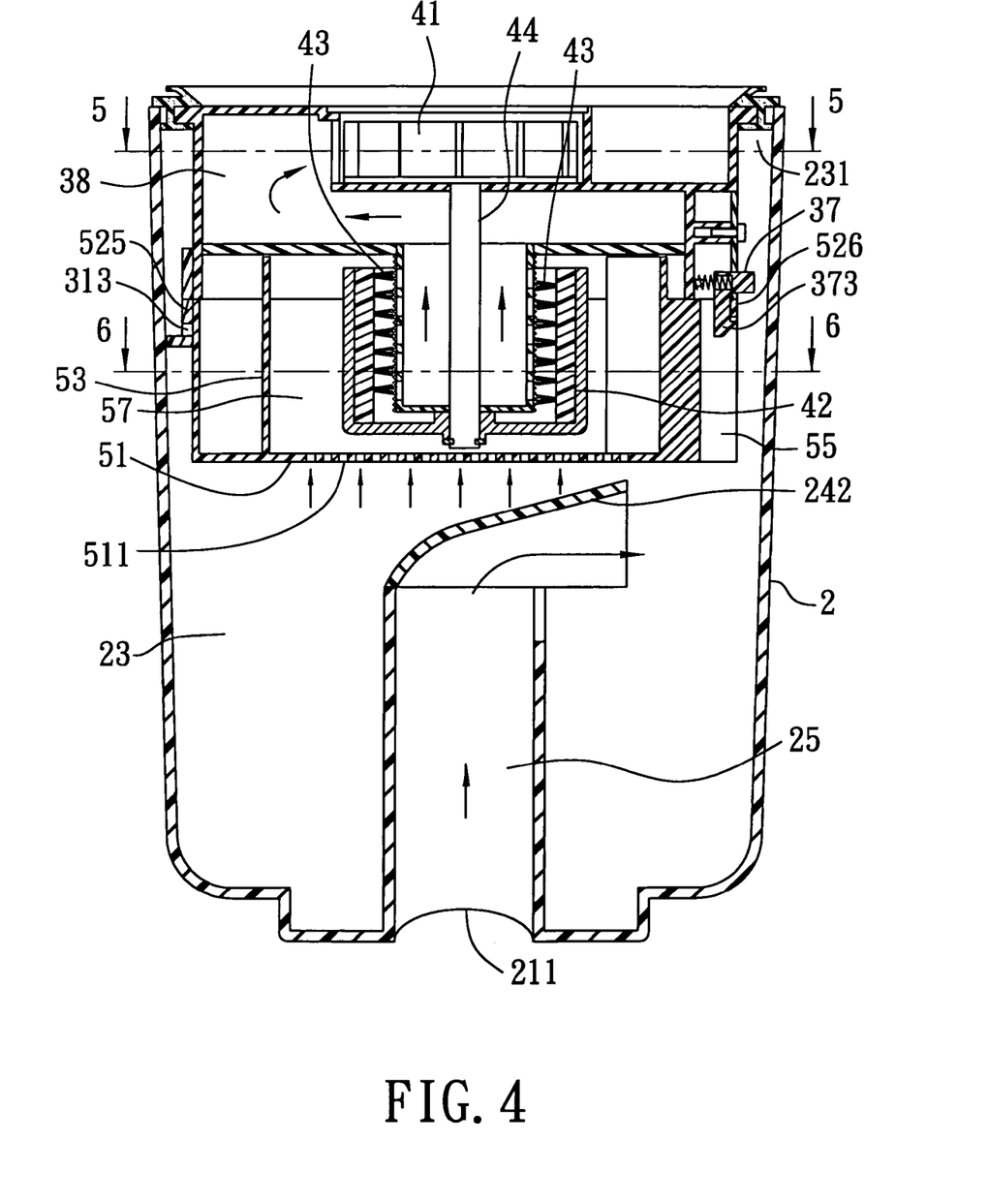
FIG. 4 is an assembled sectional view of the first preferred embodiment.
Figure 5:
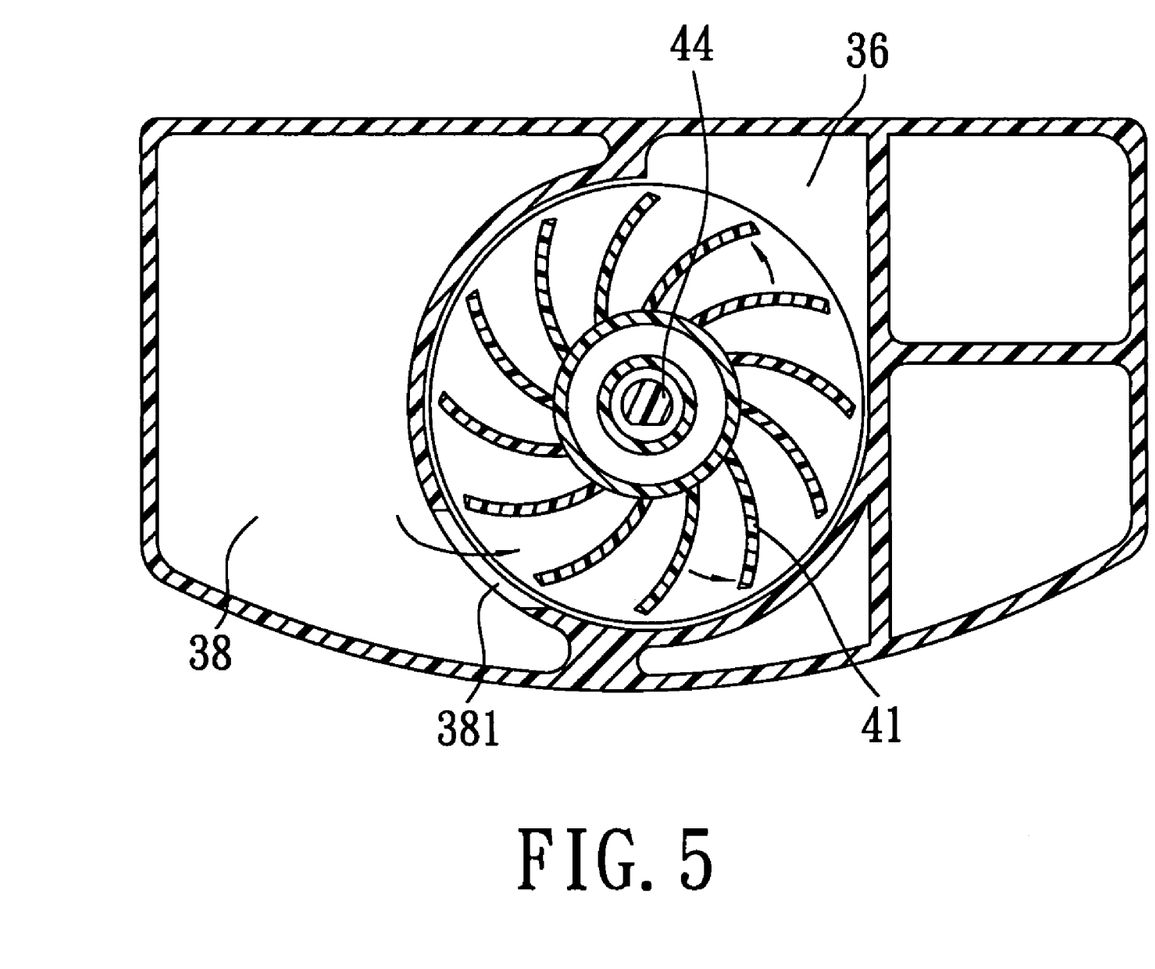
FIG. 5 is a sectional view of the first preferred embodiment, taken along Line 5-5 in FIG. 4.
Figure 6:
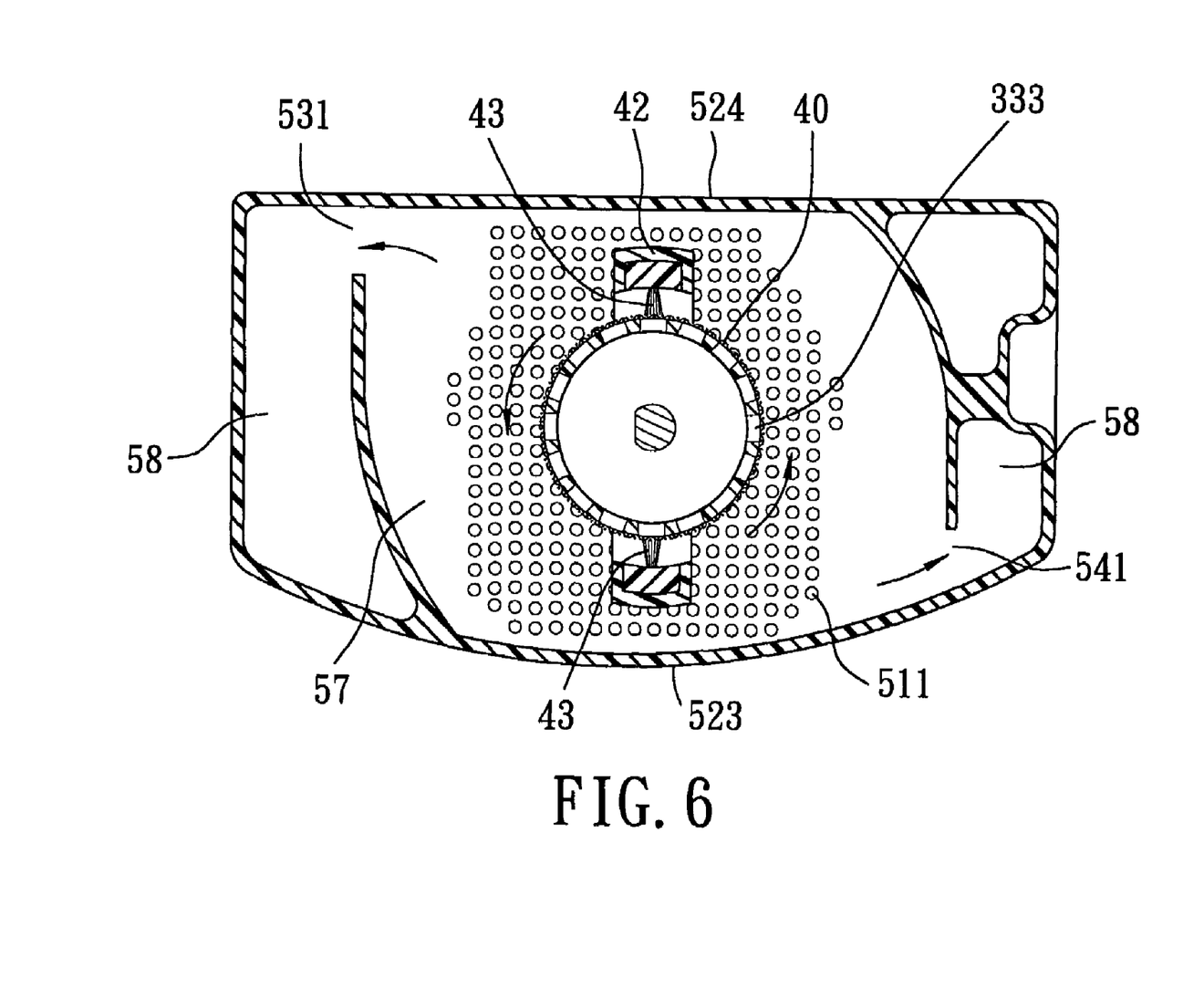
FIG. 6 is a sectional view of the first preferred embodiment, taken along Line 6-6 in FIG. 4.

The wind-guiding outlet 381 is situated so as to guide air to rotate the vane wheel 41 within the wheel chamber 36 when airflow occurs within the wheel chamber 36, as shown in FIG. 5. Occurrence of airflow within the wheel chamber 36 results in synchronous rotation of the vane wheel 41 and the rotatable brush holder 42 within the dust-collecting main seat 2. Hence, the dust brushes 43 will brush the dust-collecting net 40. This can remove the fine dust particles from the dust-collecting net 40. As a consequence, air can flow fully through the dust-collecting net 40 so as to prevent a reduction in the suction force caused by the clogging of the dust-collecting net 40 with dust particles. Furthermore, rotation of the rotatable brush holder 42 and the dust brushes 43 within the dust-removing chamber 57 results in the flow of air around the rotatable brush holder 42 in a direction indicated by the arrows in FIG. 6. As a result, the fine dust particles (not shown) are moved from the dust-removing chamber 57 into the second dust-collecting chambers 58 along the front and rear walls 523, 524 via the first and second wind-guiding ports 531, 541, respectively. Therefore, clogging of the airflow path can be prevented.

Figure 7:
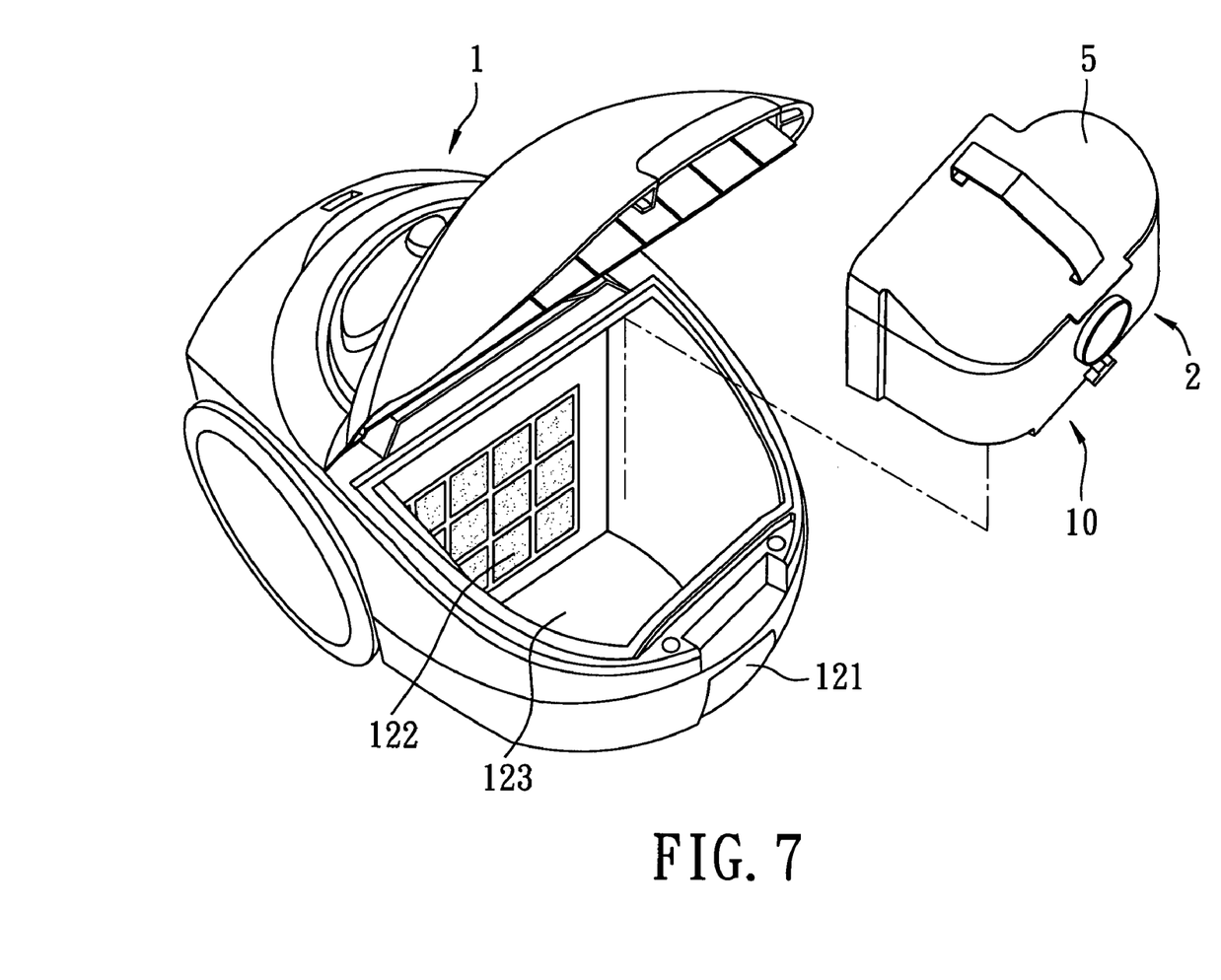
FIG. 7 is a partly exploded perspective view of a horizontal type vacuum cleaner that incorporates the second preferred embodiment of a dust collector according to this invention.
Figure 8:
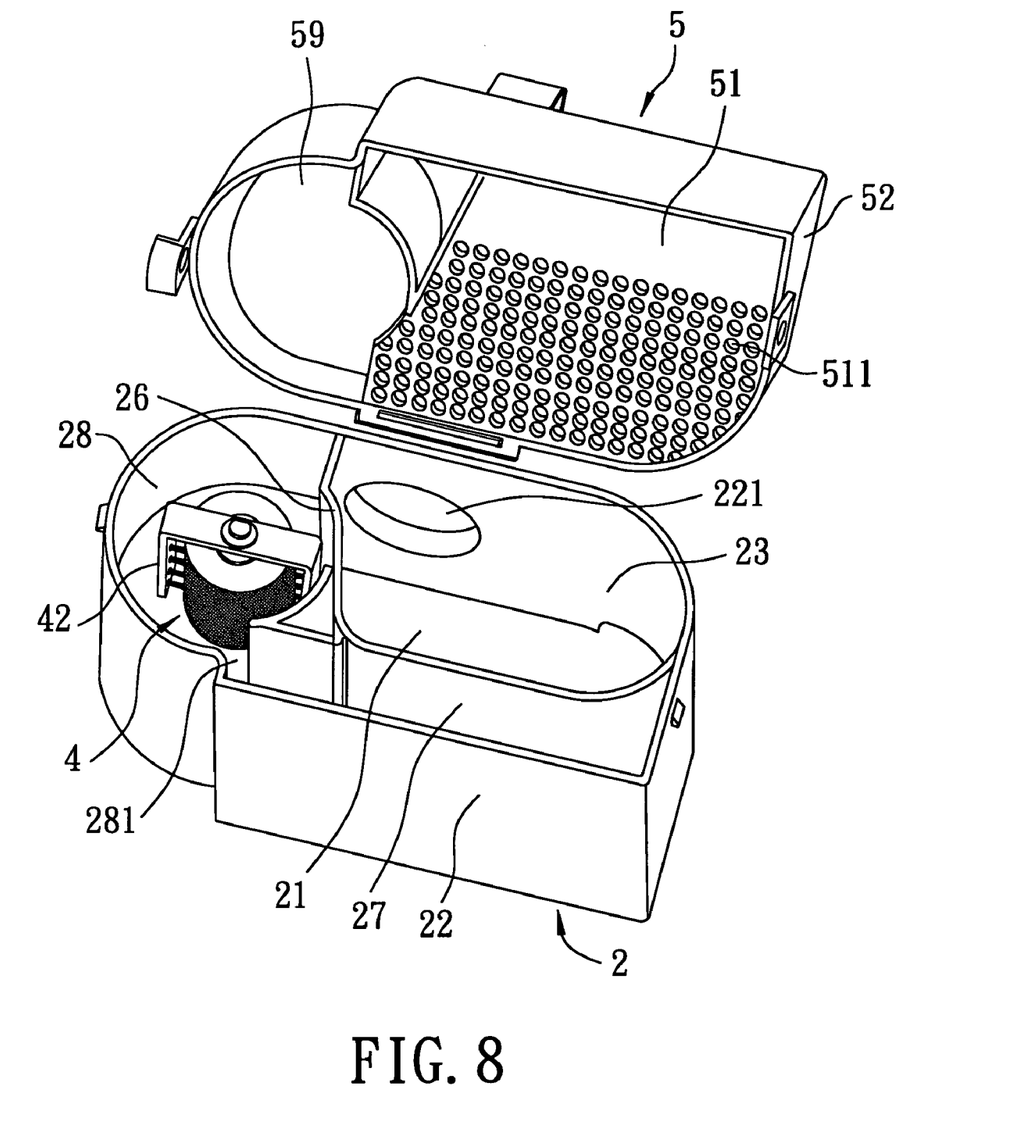
FIG. 8 is a partly exploded perspective view of the second preferred embodiment.
Figure 9:
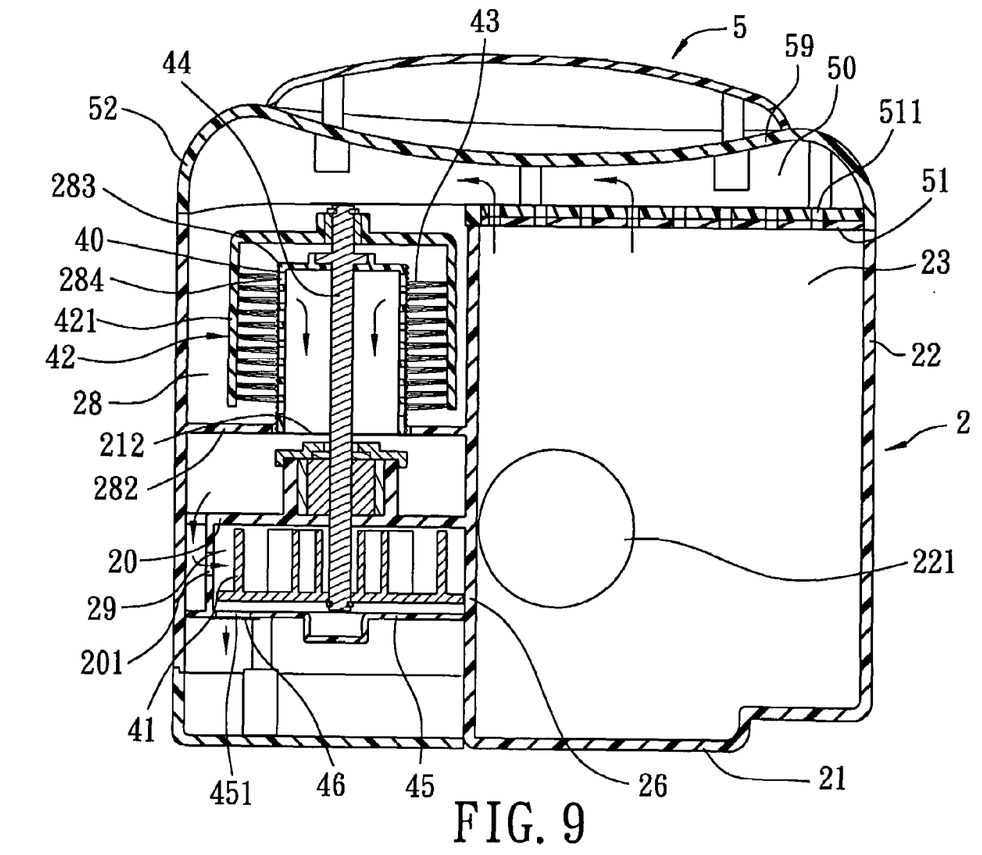
FIG. 9 is an assembled sectional view of the second preferred embodiment.

Referring to FIGS. 7, 8, and 9, the second preferred embodiment of a horizontal type dust collector 10 according to this invention is incorporated in a vacuum cleaner utilizing a canister design. The vacuum cleaner has a cleaner body 1 that is formed with an intake port 121 and an exhaust port 122. The dust collector 10 is disposed removably within a mounting chamber 123 in the cleaner body 1, and is located between the intake port 121 and the exhaust port 122.

The dust collector 10 includes a dust-collecting main seat 2, a dust-brushing unit 4, and a pre-separating seat 5.

The dust-collecting main seat 2 includes a bottom wall 21, a dust-collecting main wall 22, a first dust-collecting chamber 23, a partition member 26, a second dust-collecting chamber 27, a dust-removing chamber 28, a wheel chamber 29, and a mounting plate 20. The dust-collecting main wall 22 extends upwardly from an outer periphery of the bottom wall 21, and is formed with a first inlet 221 that is in fluid communication with the intake port 121 in the cleaner body 1. The first dust-collecting chamber 23 is defined by the bottom wall 21 and the dust-collecting main wall 22. The partition member 26 defines the first dust-collecting chamber 23, the second dust-collecting chamber 27, and the dust-removing chamber 28 in the dust-collecting seat 2. The dust-removing chamber 28 is spaced apart from the first dust-collecting chamber 23, and is disposed directly above the wheel chamber 29. The mounting plate 20 is disposed between the dust-removing chamber 28 and the wheel chamber 29, and has a wind-guiding outlet 201. A wind-guiding port 281 is formed between and is in fluid communication with the second dust-collecting chamber 27 and the dust-removing chamber 28. A horizontal plate 282 is fixed in the dust-removing chamber 28. A vertical intake tube 283 extends integrally and upwardly from the horizontal plate 282, and is formed with a plurality of vent holes 284.

The dust-brushing unit 4 includes a vane wheel 41, a rotatable brush holder 42, a plurality of dust brushes 43, a vertical connecting rod 44, a cover plate 45, a filtering net 46, and a dust-collecting net 40. The dust-collecting net 40 covers the vent holes 284 in the intake tube 283. The vane wheel 41 is disposed rotatably within the wheel chamber 29. The wind-guiding outlet 201 is situated so as to guide air from the dust-removing chamber 28 into the wheel chamber 29, thereby rotating the vane wheel 41. The rotatable brush holder 42 is disposed rotatably within the dust-removing chamber 28 in the same manner as in the first embodiment, and includes two diametrically opposite vertical mounting walls 421 that are spaced apart from each other by a distance larger than the diameter of the intake tube 283. The dust brushes 43 are attached to the rotatable brush holder 42 in the same manner as in the first embodiment. The connecting rod 44 is connected fixedly to the vane wheel 41 and the rotatable brush holder 42. This allows for synchronous rotation of the vane wheel 41 and the rotatable brush holder 42. The cover plate 45 is connected fixedly to the partition member 26, defines a bottom end of the wheel chamber 29, and has a discharge hole 451 that is in fluid communication with both the exhaust port 122 in the cleaner body 1 and the wheel chamber 29. The filtering net 46 covers the discharge hole 451.

The pre-separating seat 5 is disposed on and above the dust-collecting main seat 2, and includes a top wall 59, a surrounding wall 52 extending from the top wall 59 toward the dust-collecting main wall 22, a horizontal base wall 51 disposed between the top wall 59 and the dust-collecting main seat 2 and defining a top end of the first dust-collecting chamber 23, and a guiding chamber 50 defined among the base wall 51, the surrounding wall 52, and the top wall 59. The base wall 51 is formed with a plurality of vent holes 511 that are in fluid communication with the first dust-collecting chamber 23 and the guiding chamber 50 and that are sized so as to permit the passage of fine dust particle therethrough.

As such, an airflow path is formed in the dust collector 10, and includes the first inlet 221, the first dust-collecting chamber 23, the vent holes 511, the guiding chamber 50, the dust-removing chamber 28, the vent holes 284, an interior space within the intake tube 283, the wind-guiding outlet 201, the wheel chamber 29, and the discharge hole 451. A motor (not shown) can be powered to force air into the intake port 121 in the cleaner body 1. The air then flows through the dust collector 10 along the airflow path.

The base wall 51 can prevent coarse dust particles, which are more bulky than the fine dust particles, from entering into the guiding chamber 50. As a result, the coarse dust particles are collected within the first dust-collecting chamber 23.

When airflow occurs within the wheel chamber 29, the vane wheel 41 and the rotatable brush holder 42 rotate within the dust-collecting main seat 2. Hence, the dust brushes 43 brush the dust-collecting net 40 so as to remove the fine dust particles from the dust-collecting net 40. Thereafter, an annular airflow occurring within the dust-removing chamber 28 will move the fine dust particles into the second dust-collecting chamber 27.

With this invention thus explained, it is apparent that numerous modifications and variations can be made without departing from the scope and spirit of this invention. It is therefore intended that this invention be limited only as indicated by the appended claims.

I claim:

1. A dust collector for a vacuum cleaner, the vacuum cleaner having a cleaner body that is formed with an intake port and an exhaust port, said dust collector being adapted to be disposed within the cleaner body between the intake port and exhaust port and comprising:

a dust-collecting main seat including a first dust-collecting chamber that has an upper end opening, and a first inlet that is adapted to be disposed between and to be in fluid communication with the intake port in the cleaner body and said first dust-collecting chamber;

a mounting seat connected removably to said dust-collecting main seat and disposed within said upper end opening of said first dust-collecting chamber, said mounting seat including a bottom plate, and an intake tube projecting downwardly from said bottom plate and having a plurality of vent holes; and a dust-bushing unit including a rotatable brush holder rotatable relative to said dust-collecting main seat in response to flow of air from the intake port in the cleaner body into the exhaust port in the cleaner, a dust-collecting net covering said vent holes in said mounting seat, and a plurality of dust brushes attached to said rotatable brush holder and brushing said dust-collecting net so as to remove dust from said dust-collecting net when said rotatable brush holder rotates relative to said dust-collecting main seat;

whereby, when sucked into the intake port in the cleaner body, air flows from the intake port into the exhaust port, and therefore rotates said rotatable brush holder relative to said dust-collecting main seat so as to remove dust from said dust-collecting net by said dust brushes;

wherein said mounting seat further includes a wheel chamber disposed directly above said intake tube, said dust-brushing unit further including a vane wheel disposed rotatably within said wheel chamber in said mounting seat and connected to said rotatable brush holder so as to allow for synchronous rotation of said vane wheel and said rotatable brush holder when air flows from the intake port into the exhaust port;

wherein said mounting seat further includes a mounting plate disposed above said bottom plate and defining said wheel chamber, and a wind-guiding chamber disposed between said bottom plate and said mounting plate and having a wind-guiding outlet that guides air from said intake tube into said wheel chamber.

2. The dust collector as claimed in claim 1, wherein said rotatable brush holder includes two diametrically opposed vertical mounting walls that are spaced apart from each other by a distance slightly larger than a diameter of said intake tube, said dust brushes being secured to said mounting walls of said rotatable brush holder and extending toward said intake tube, said dust brushes secured to one of said mounting walls being staggered with respect to said dust brushes secured to the other of said mounting walls.

3. The dust collector as claimed in claim 1, wherein said bottom plate of said mounting seat has a second inlet, said intake tube of said mounting seat including a cylindrical surrounding wall having an upper end secured within said second inlet in said bottom plate, and a connecting wall having an outer periphery connected fixedly to a lower end of said cylindrical surrounding wall, and a first rod hole formed through said connecting wall of said intake tube, said mounting plate of said mounting seat having a second rod hole disposed directly above said first rod hole in said connecting wall of said intake tube, said dust-brushing unit further including a connecting rod extending through both said first rod hole in said connecting wall of said intake tube and said second rod hole in said mounting plate and connecting said vane wheel fixedly to said rotatable brush holder.

4. The dust collector as claimed in claim 1, further comprising a pre-separating seat that is disposed within said first dust-collecting chamber in said dust-collecting main seat and that receives said intake tube of said mounting seat, said pre-separating seat being formed with a plurality of vent holes such that air can flow from the intake port into said intake tube only through said vent holes in said pre-separating seat said vent holes in said pre-separating seat being sized so as to allow for passage of fine dust particles therethrough, said dust-collecting net of said dust-brushing unit having a plurality of meshes that are sized so as to prevent passage of fine dust particles therethrough, whereby, when incoming dust-laden air enters into said first dust-collecting chamber in said dust-collecting main seat via said first inlet, said pre-separating seat can prevent coarse dust particles, which are more bulky than the fine dust particles, from approaching said intake tube.

5. The dust collector as claimed in claim 4, wherein said pre-separating seat includes:
  a horizontal base wall, said vent holes in said pre-separating seat being vertical and being formed through said horizontal base wall;
  a surrounding wall extending upwardly from an outer periphery of said horizontal base wall; and
  a wind-guiding plate extending upwardly from said horizontal base wall and abutting against a bottom surface of said bottom plate of said mounting seat, a space among said bottom plate, said horizontal bottom wall of said pre-separating seat, and said surrounding wall of said pre-separating seat being divided by said wind-guiding plate into a dust-removing chamber and a second dust-collecting chamber, said rotatable brush holder being disposed rotatably within said dust-removing chamber, said wind-guiding plate having two opposite vertical sides, one of said vertical sides being connected fixedly to said surrounding wall of said pre-separating seat, the other of said vertical sides being spaced apart from said surrounding wall of said pre-separating seat to define a wind-guiding port therebetween, rotation of said rotatable brush holder and said dust brushes within said dust-removing chamber resulting in movement of the fine dust particles from said dust-removing chamber into said second dust-collecting chamber.

6. The dust collector as claimed in claim 5, wherein said dust-collecting main seat further includes:
  a bottom wall, through which said first inlet extends;
  a bottom wall, through which said first inlet extends;
  a dust-collecting main wall extending upwardly from an outer periphery of said bottom wall; and
  an air-guiding tube having a lower end connected fixedly to said bottom wall of said dust-collecting main seat and disposed around said first inlet, and an upper end outlet that is oriented so as to guide the incoming dust-laden air to flow toward a portion of said dust-collecting main wall disposed above said air-guiding tube, said first dust-collecting chamber being defined among said air-guiding tube, said bottom wall of said dust-collecting main seat, and said dust-collecting main wall of said dust-collecting main seat.

7. A dust collector for a vacuum cleaner, the vacuum cleaner having a cleaner body that is formed with an intake port and an exhaust port, said dust collector being adapted to be disposed within the cleaner body and comprising:
  a dust-collecting main seat including a bottom wall, a dust-collecting main wall extending upwardly from an outer periphery of said bottom wall of said dust-collecting main seat, a first dust-collecting chamber, a dust-removing chamber spaced apart from said first dust-collecting chamber, and a vertical intake tube disposed fixedly within said dust-removing chamber and having a plurality of vent holes;
  a dust-brushing unit including a rotatable brush holder rotatable within said dust-removing chamber in said dust-collecting main seat in response to flow of air from the intake port in the cleaner body into the exhaust port in the cleaner, a dust-collecting net covering said vent holes in said intake tube, and a plurality of dust brushes attached to said rotatable brush holder and brushing said dust-collecting net so as to remove dust from said dust-collecting net when said rotatable brush holder rotates within said dust-collecting main seat; and a pre-separating seat disposed on and above said dust-collecting main seat and including a top wall, a surrounding wall extending from said top wall of said pre-separating seat toward said dust-collecting main wall of said dust-collecting main seat, a base wall disposed between said top wall of said pre-separating seat and said dust-collecting main seat and defining a top end of said first dust-collecting chamber, and a guiding chamber defined among said base wall, said surrounding wall of said pre-separating seat, and said top wall, said base wall being formed with a plurality of vent holes that are in fluid communication with both said first dust-collecting chamber and said guiding chamber and that are sized so as to permit passage of fine dust particles therethrough;

wherein air flows from the intake port into the exhaust port along an airflow path including said first inlet in said dust-collecting main seat, said first dust-collecting chamber in said dust-collecting main seat, said vent holes in said base wall of said pre-separating seat, said guiding chamber in said pre-separating seat, said dust-removing chamber in said dust-collecting main seat, and said vent holes in said intake tube of said dust-collecting main seat;

wherein said dust-collecting main seat further includes a second dust collecting chamber, and a wind-guiding port in fluid communication with both said second dust-collecting chamber and said dust-removing chamber.

8. The dust collector as claimed in claim 7, wherein said dust-collecting main seat further includes a partition member for defining said dust-removing chamber and said first and second dust-collecting chambers in said dust-collecting main seat.

9. The dust collector as claimed in claim 7, wherein said dust-collecting main seat further includes a wheel chamber disposed under said dust-removing chamber, said dust-brushing unit further including a vane wheel connected to said rotatable brush holder so as to allow for synchronous rotation with said rotatable brush holder.

10. The dust collector as claimed in claim 9, wherein said dust-brushing unit further includes a cover plate defining a bottom end of said wheel chamber and having a discharge hole that is adapted to be in fluid communication with both the exhaust port in the cleaner body and said wheel chamber, and a filtering net covering said discharge hole.

11. The dust collector as claimed in claim 10, wherein said dust-brushing unit further includes a vertical connecting rod connecting said vane wheel fixedly to said rotatable brush holder, said rotatable brush holder including two diametrically opposed vertical mounting walls that are spaced apart from each other by a distance slightly larger than a diameter of said intake tube, said dust brushes being secured to said mounting walls of said rotatable brush holder and extending toward said intake tube, said dust brushes secured to one of said mounting walls being staggered with respect to said dust brushes secured to the other of said mounting walls.

12. A dust collector for a vacuum cleaner, the vacuum cleaner having a cleaner body that is formed with an intake port and an exhaust port, said dust collector being adapted to be disposed within the cleaner body between the intake port and exhaust port and comprising:

a dust-collecting main seat including a first dust-collecting chamber that has an upper end opening, and a first inlet mat is adapted to be disposed between and to be in fluid communication with the intake port in the cleaner body and said first dust-collecting chamber;

a mounting seat connected removably to said dust-collecting main seat and disposed within said upper end opening of said first dust-collecting chamber, said mounting seat including a bottom plate, and an intake tube projecting downwardly from said bottom plate and having a plurality of vent holes;

a dust-brushing unit including a rotatable brush holder rotatable relative to said dust-collecting main seat in response to flow of air from the intake port in the cleaner body into the exhaust port in the cleaner, a dust-collecting net covering said vent holes in said mounting seat, and a plurality of dust brushes attached to said rotatable brush holder and brushing said dust-collecting net so as to remove dust from said dust-collecting net when said rotatable brush holder rotates relative to said dust-collecting main seat;

whereby, when sucked into the intake port in the cleaner body, air flows from the intake port into the exhaust port, and therefore rotates said rotatable brush holder relative to said dust-collecting main seat so as to remove dust from said dust-collecting net by said dust brushes; and a pre-separating seat that is disposed within said first dust-collecting chamber in said dust-collecting main seat and that receives said intake tube of said mounting seat, said pre-separating seat being formed with a plurality of vent holes such that air can flow from the intake port into said intake tube only through said vent holes in said pre-separating seat, said vent holes in said pre-separating seat being sized so as to allow for passage of fine dust particles therethrough, said dust-collecting net of said dust-brushing unit having a plurality of meshes that are sized so as to prevent passage of fine dust particles therethrough, whereby, when incoming dust-laden air enters into said first dust-collecting chamber in said dust-collecting main seat via said first inlet, said pre-separating seat can prevent coarse dust particles, which are more bulky than the fine dust particles, from approaching said intake tube;

wherein said pre-separating seat includes:

a horizontal base wall, said vent holes in said pre-separating seat being vertical and being formed through said horizontal base wall;

a surrounding wall extending upwardly from an outer periphery of said horizontal base wall; and a wind-guiding plate extending upwardly from said horizontal base wall and abutting against a bottom surface of said bottom plate of said mounting seat, a space among said bottom plate, said horizontal bottom wall of said pre-separating seat, and said surrounding wall of said pre-separating seat being divided by said wind-guiding plate into a dust-removing chamber and a second dust-collecting chamber, said rotatable brush holder being disposed rotatably within said dust-removing chamber, said wind-guiding plate having two opposite vertical sides, one of said vertical sides being connected fixedly to said surrounding wall of said pre-separating seat, the other of said vertical sides being spaced apart from said surrounding wall of said pre-separating seat to define a wind-guiding port therebetween, rotation of said rotatable brush holder and said dust brushes within said dust-removing chamber resulting in movement of the fine dust particles from said dust-removing chamber into said second dust-collecting chamber.

13. The dust collector as claimed in claim 12, wherein said mounting seat further includes a wheel chamber disposed directly above said intake tube, said dust-brushing unit further including a vane wheel disposed rotatably within said wheel chamber in said mounting seat and connected to said rotatable brush holder so as to allow for synchronous rotation of said vane wheel and said rotatable brush holder when air flows from the intake port into the exhaust port.

14. The dust collector as claimed in claim 13, wherein said rotatable brush holder includes two diametrically opposed vertical mounting walls that are spaced apart from each other by a distance slightly larger than a diameter of said intake tube, said dust brushes being secured to said mounting walls of said rotatable brush holder and extending toward said intake tube, said dust brushes secured to one of said mounting walls being staggered with respect to said dust brushes secured to the other of said mounting walls.

15. The dust collector as claimed in claim 13, wherein said mounting seat further includes a mounting plate disposed above said bottom plate and defining said wheel chamber, and a wind-guiding chamber disposed between said bottom plate and said mounting plate and having a wind-guiding outlet that guides air from said intake tube into said wheel chamber.

16. The dust collector as claimed in claim 15, wherein said bottom plate of said mounting seat has a second inlet, said intake tube of said mounting seat including a cylindrical surrounding wall having an upper end secured within said second inlet in said bottom plate, and a connecting wall having an outer periphery connected fixedly to a lower end of said cylindrical surrounding wall, and a first rod hole formed through said connecting wall of said intake tube, said mounting plate of said mounting seat having a second rod hole disposed directly above said first rod hole in said connecting wall of said intake tube, said dust-brushing unit further including a connecting rod extending through both said first rod hole in said connecting wall of said intake tube and said second rod hole in said mounting plate and connecting said vane wheel fixedly to said rotatable brush holder.

17. The dust collector as claimed in claim 12, wherein said dust-collecting main seat further includes:
  a bottom wall, through which said first inlet extends;
  a dust-collecting main wall extending upwardly from an outer periphery of said bottom wall; and
  an air-guiding tube having a lower end connected fixedly to said bottom wall of said dust-collecting main seat and disposed around said first inlet, and an upper end outlet that is oriented so as to guide the incoming dust-laden air to flow toward a portion of said dust-collecting main wall disposed above said air-guiding tube, said first dust-collecting chamber being defined among said air-guiding tube, said bottom wall of said dust-collecting main seat, and said dust-collecting main wall of said dust-collecting main seat.

18. A dust collector for a vacuum cleaner, the vacuum cleaner having a cleaner body that is formed with an intake port and an exhaust port, said dust collector being adapted to be disposed within the cleaner body and comprising:
  a dust-collecting main seat including a bottom wall, a dust-collecting main wall extending upwardly from an outer periphery of said bottom wall of said dust-collecting main seat, a first dust-collecting chamber, a dust-removing chamber spaced apart from said first dust-collecting chamber, and a vertical intake tube disposed fixedly within said dust-removing chamber and having a plurality of vent holes;
  a dust-brushing unit including a rotatable brush holder rotatable within said dust-removing chamber in said dust-collecting main seat in response to flow of air from the intake port in the cleaner body into the exhaust port in the cleaner, a dust-collecting net covering said vent holes in said intake tube, and a plurality of dust brushes attached to said rotatable brush holder and brushing said dust-collecting net so as to remove dust from said dust-collecting net when said rotatable brush holder rotates within said dust-collecting main seat; and
  a pre-separating seat disposed on and above said dust-collecting main seat and including a top wall, a surrounding wall extending from said top wall of said pre-separating seat toward said dust-collecting main wall of said dust-collecting main seat, a base wall disposed between said top wall of said pre-separating seat and said dust-collecting main seat and defining a top end of said first dust-collecting chamber, and a guiding chamber defined among said base wall, said surrounding wall of said pre-separating seat, and said top wall, said base wall being formed with a plurality of vent holes that are in fluid communication with both said first dust-collecting chamber and said guiding chamber and that are sized so as to permit passage of fine dust particles therethrough;
  wherein air flows from the intake port into the exhaust port along an airflow path including said first inlet in said dust-collecting main seat, said first dust-collecting chamber in said dust-collecting main seat, said vent holes in said base wall of said pre-separating seat, said guiding chamber in said pre-separating seat, said dust-removing chamber in said dust-collecting main seat, and said vent holes in said intake tube of said dust-collecting main seat;
  wherein said dust-collecting main seat further includes a wheel chamber disposed under said dust-removing chamber, said dust-brushing unit further including a vane wheel connected to said rotatable brush holder so as to allow for synchronous rotation with said rotatable brush holder;
  wherein said dust-brushing unit further includes a cover plate defining a bottom end of said wheel chamber and having a discharge hole that is adapted to be in fluid communication with both the exhaust port in the cleaner body and said wheel chamber, and a filtering net covering said discharge hole.

19. The dust collector as claimed in claim 18, wherein said dust-collecting main seat further includes a second dust-collecting chamber, and a wind-guiding port in fluid communication with both said second dust-collecting chamber and said dust-removing chamber.

20. The dust collector as claimed in claim 19, wherein said dust-collecting main seat further includes a partition member for defining said dust-removing chamber and said first and second dust-collecting chambers in said dust-collecting main seat.

21. The dust collector as claimed in claim 18, wherein said dust-brushing unit further includes a vertical connecting rod connecting said vane wheel fixedly to said rotatable brush holder, said rotatable brush holder including two diametrically opposed vertical mounting walls that are spaced apart from each other by a distance slightly larger than a diameter of said intake tube, said dust brushes being secured to said mounting walls of said rotatable brush holder and extending toward said intake tube, said dust brushes secured to one of said mounting walls being staggered with respect to said dust brushes secured to the other of said mounting walls.

* * * * *